Aug. 22, 1950 A. A. VARELA 2,519,419
PULSE RECEIVER
Filed Aug. 1, 1945
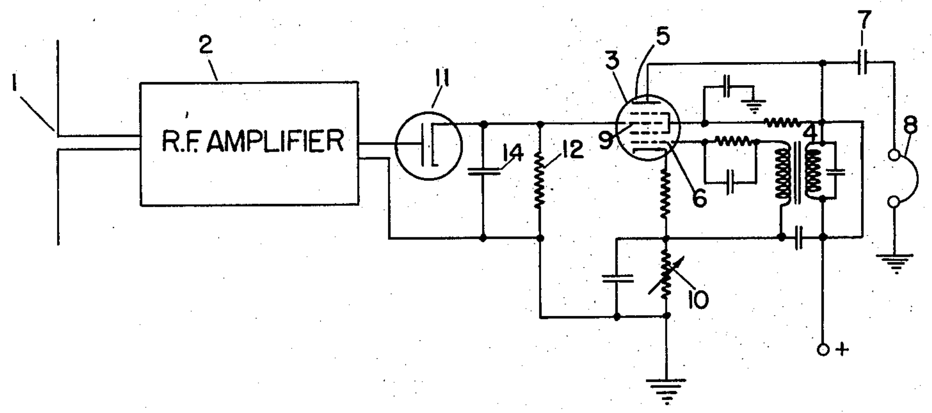
Inventor
ARTHUR A. VARELA
By Ralph L. Chappell
Attorney Patented Aug. 22, 1950 2,519,419

UNITED STATES PATENT OFFICE 2,519,419

PULSE RECEIVER

Arthur A. Varela, Washington, D. C.

Application August 1, 1945, Serial No. 608,330

1 Claim. (Cl. 250—8)

(Granted under the act of March 3, 1883, as amended April 30, 1928; 370 O. G. 757)

This invention relates to means for aurally detecting short impulse radiation, and is particularly directed to the problem of ascertaining the presence of radar transmission.

Such short impulse radiation comprises wave groups of the order of ten microseconds duration ordinarily appearing recurrently with frequencies usually in the audio range. Due to the very short duration of the impulses, normal communication receivers are wholly unsatisfactory for monitoring purposes, due to the long time constants present in said receivers, and particularly in the audio section thereof. Receiver systems specifically designed for pulse communication are also inefficient for aural monitoring due to the signal characteristics. Further, previously known systems are ineffective in monitoring for isolated pulses or pulses appearing above or below the frequency of tonal perception.

Accordingly, it is the primary object of the invention to provide a pulse receiver operative to give an audible indication of a pulse or a series of pulses.

The invention will be described with reference to the exemplary embodiment shown in the drawing. This includes antenna 1, and radio frequency amplifier 2, the output of which keys an audio oscillator on each impulse received. The keying circuit has a long discharge time constant so that the oscillator keying period is extended to the extent desired beyond the end of each received impulse. Consequently the output of the receiver is no longer comprised of infinitesimal pulses, but of extended audio wave groups, and functions efficiently for aural use. The oscillator shown employs tube 3 and coupling transformer 4 connected suitably with anode 5 and control grid 6. The output of the oscillator is taken off through blocking condenser 7 to the transducer shown as phones 8.

The oscillator is keyed by application of a control voltage to grid 9. Through adjustment of the bias resistor 10 for grid 9, the oscillator is set to be normally blocked in the absence of the pulse signal from the amplifier, and is also unresponsive to the average noise level.

The keying circuit applies a positive keying voltage having a value varying with the amplitude of the received signal. This voltage is supplied through diode 11 and is developed across grid resistor 12 and condenser 14. The blocking bias is thereby overcome, and the oscillator circuit is permitted to operate. The duration of oscillation is determined by the discharge time constant of the keying circuit in combination with the signal amplitude, it being noted that the keying grid 9 is independent of the control grid 6, and that current is not drawn by the keying grid when the circuit oscillates. The keying voltage is developed across condenser 14 by a low time constant circuit, the diode impedance being negligible, whereas that of the discharge circuit across resistor 12 will be relatively high. Variation of the keying voltage amplitude with the signal permits approximate direction finding operation through consequent variations in the audio output.

The keying period may be adjusted by variation of grid resistor 12 which determines the discharge time constant of the keying circuit. The discharge time constant will in any case be long relative to the duration of the received impulse. Normally the audio oscillator frequency will be above that of the expected radar impulse frequency.

It will be understood that the embodiment shown in the drawings has been selected for purposes of illustration only, and that the limits of the invention are defined in the appended claim.

The invention described herein may be manufactured and used by or for the Government of the United States of America for governmental purposes without the payment of any royalties thereon or therefor.

What is claimed is:

In a system for detecting impulse radiation, a normally blocked audio oscillator including a vacuum tube having anode, cathode and control grid means, a keying grid in said tube controlling the space current through the tube and independent of the oscillation voltages, and means operative in dependency on a received impulse to drive said keying grid positive an amount dependant upon the amplitude of the impulse, and relatively long time constant means controlling the discharge of said grid operative to extend the oscillator keying period beyond the termination of the received impulse.

ARTHUR A. VARELA.

REFERENCES CITED

The following references are of record in the file of this patent:

UNITED STATES PATENTS

| Number | Name | Date |
|---|---|---|
| 1,489,158 | Schaffer | Apr. 1, 1924 |
| 1,902,234 | Heintz | Mar. 21, 1933 |

FOREIGN PATENTS

| Number | Country | Date |
|---|---|---|
| 153,690 | Great Britain | Nov. 18, 1920 |